(No Model.)

W. C. WHITACRE.
TRIPLE VALVE.

No. 512,241. Patented Jan. 2, 1894.

2 Sheets—Sheet 1.

WITNESSES.
Thos. E. Flaherty
H. K. Wagner

INVENTOR.
William C. Whitacre
By his Attorney
Alfred Ramel (No Model.)  2 Sheets—Sheet 2.

W. C. WHITACRE.
TRIPLE VALVE.

No. 512,241. Patented Jan. 2, 1894.

WITNESSES.
Thos. E. Flaherty
H. H. Wagner

INVENTOR.
William C. Whitacre
By his Attorney
Alfred Ramel

UNITED STATES PATENT OFFICE.

WILLIAM C. WHITACRE, OF ST. LOUIS, MISSOURI, ASSIGNOR OF TWO-THIRDS TO JOHN F. BAUMGARTNER AND SHEPARD KNAPP, OF SAME PLACE.

TRIPLE VALVE.

SPECIFICATION forming part of Letters Patent No. 512,241, dated January 2, 1894.

Application filed March 29, 1892. Serial No. 426,920. (No model.)

*To all whom it may concern:*

Be it known that I, WILLIAM C. WHITACRE, a citizen of the United States, residing in the city of St. Louis and State of Missouri, have invented certain new and useful Improvements in Triple Valves, of which the following is a full, clear, and exact description.

My invention relates to triple valves for pneumatic brakes, and has for its object to simplify its construction and, in its operation, to make it more positively automatic.

It consists in improvements in triple valves hereinafter described.

Figure 1:
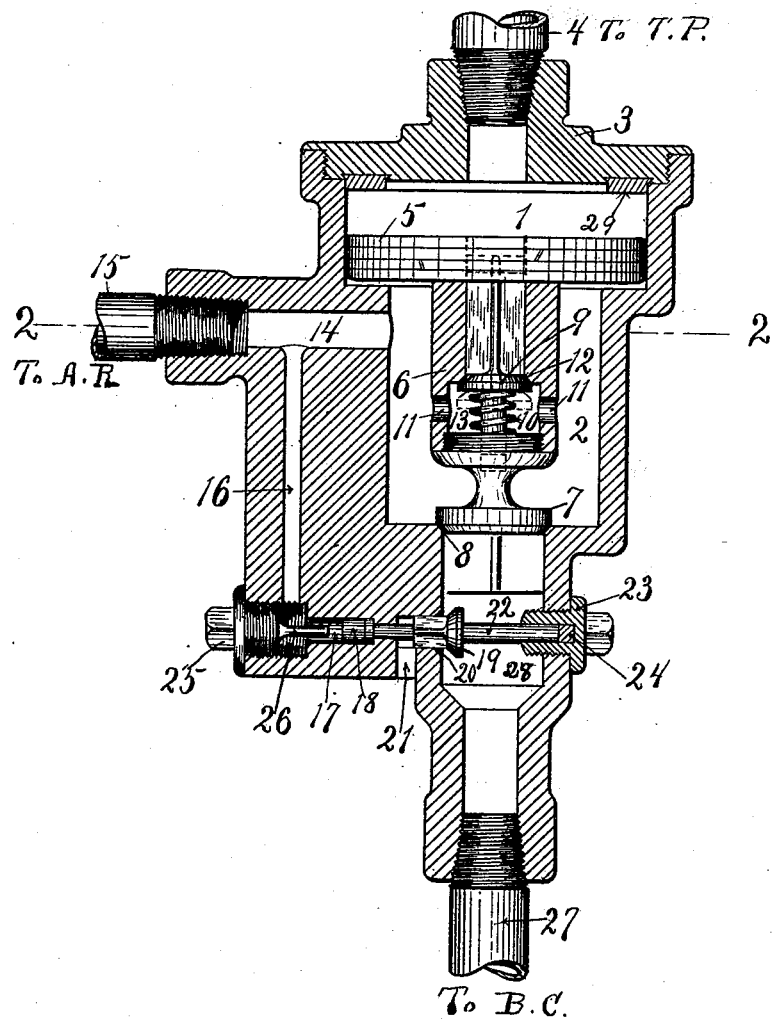
Figure 2:
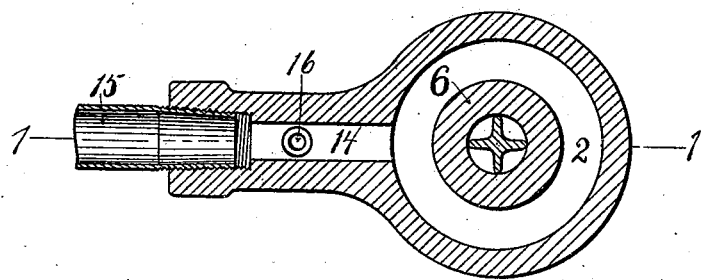
Figure 3:
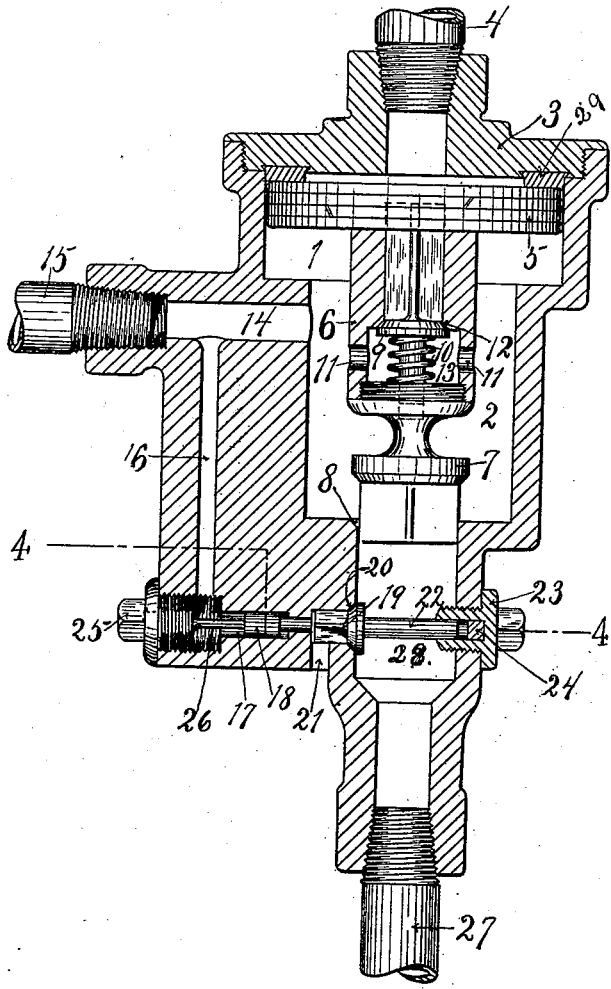
Figure 4:
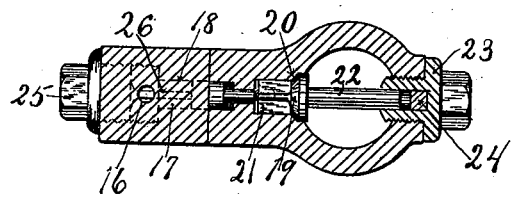

In the accompanying drawings, which serve to illustrate my invention and in which like numerals of reference denote like parts in the several figures, Figures 1 and 3 are longitudinal sections taken as on the line 1—1 in Fig. 2. Fig. 2 is a cross-section taken as on the line 2—2 in Fig. 1; and Fig. 4 is a section taken as on the line 4—4 in Fig. 3.

The valve, as a whole, as illustrated in Figs. 1 and 3, is formed with a main valve chamber or cylinder which is bored, or otherwise formed, concentrically to two different diameters, as at 1 and 2, the upper open end of which is closed by the head-piece 3. Into the head-piece 3 is secured the end of the pipe 4 which connects the valve with the main or train pipe to the main reservoir (not shown). Into the relatively enlarged portion 1 of the main valve chamber is fitted the piston valve 5 which is made air-tight by the steel ring packing used in ordinary practice. The piston valve is formed with the central stem portion 6 the lower end of which comprises the valve proper, as at 7, which is fitted to the valve seat 8 which is formed in the lower end of the valve chamber. This portion 7 of the valve is preferably screwed into the lower end of the valve stem 6 closing the lower end of the hollow space which is formed by the valve stem being bored, or otherwise so formed, out longitudinally to form the valve chamber in which operates the spring governed secondary wing valve 9 which is normally held home to its seat 12 by the spring 10. The side wall of the valve stem 6 are formed with the laterally extending perforations 11 communicating from the secondary valve chamber 13 to the main valve chamber, 2. The side wall of the main valve chamber is formed with a laterally extending port 14 into which is secured the end of the pipe 15 which connects the valve, as a whole, with the auxiliary air reservoir (not shown). In the side wall of the valve casing is formed the auxiliary connecting port 16 which communicates between the port 14 and the chamber 17 in which is fitted the small piston 18 which is formed with an extending stem portion which engages, in the operation of the valve as hereinafter described, with and operates the winged puppet valve 19, for which is formed a valve seat 20, which controls the eduction port 21 from the interior of the valve, or rather the extension 28, when the main valve is open, from the valve chamber.

22 indicates an extension projecting from the head of valve 19, said extension having its end mounted in an adjustable guide bearing 23, which is preferably in the form of a screw cap or plug. The amount of longitudinal movement of the valve 19, in that direction, is determined by the packing 24 in the guide in the nut 23. The closing nut 25 is preferably formed with a finger-like projection 26 which governs the longitudinal movement in that direction of the piston, 18.

Into the lower open end of the valve casing is secured the end of the pipe 27 which connects the valve, as a whole, with the brake cylinder, (not shown.)

The ring 29 secured under the closing head piece 3, is a cushion to receive the impact of the piston valve 5—6 in its movement in that direction.

The principle of operation is as follows: When pressure is applied from the main or train pipe 4, upon the piston head of the valve and piston 5—6, the resistance of the spring 10 bearing against the auxiliary valve head 9, forces the pressure to be first brought against the increased bearing surface of the piston head 5, which forces said piston and valve 5—6 downwardly, seating the valve 7 in seat 8 and closing communication between the chamber 2 and the brake cylinder. Upon reaching the limit of its movement, the pressure which had hitherto been brought upon the head 5, is effective against the valve 9 and its compression and supporting spring 10, unseating said valve, and establishing a communication between chambers 1 and 2, and the auxiliary reservoir, through passage 14 and the pipe 15. After communication has been established between the main reservoir through the train pipe 4, and the auxiliary reservoir through the medium of the pipe 15, the pressure in the several reservoirs, viz., the main and the auxiliary reservoirs, is uniform, and should this pressure be greater per square inch than that in the brake cylinder, the piston 18 will be thrust forward, carrying with it the valve 19, whose thrust is limited by the packing 24 in the adjustable bearing plug or cap 23. By so unseating the valve 19 the brake cylinder is relieved of its high pressure by the air passing through the port 21, and the brakes thereby released.

To apply the brakes by charging the brake cylinder with air at high pressure, the high pressure in the train pipe 4 is reduced from the engine consequently permitting the high pressure in the auxiliary reservoir to assert itself beneath the head of the piston and valve 5—6 close the valve 9, and by reason of the increased area presented by the head 5 over that of the valve 7, the auxiliary reservoir pressure will unseat the latter and establish communication between the auxiliary reservoir, and the brake cylinder. By the establishment of this communication, uniform pressure is brought to bear against the piston 18 and the valve head 19 which, by reason of the larger area presented by the latter, over the area presented by the piston 18, will force the valve to its seat and close the port 21. It will be obvious that as the air in the brake cylinder was at atmospheric pressure before being charged, that by so charging from the auxiliary reservoir, the pressure in the latter is reduced, and the pressure in the auxiliary reservoir and the brake cylinder equalized. When the engineer's valve is turned on to recharge the train pipes, the pressure brought to bear on the piston head 5 being greater than that beneath the same, will force the piston and valve 5—6 downwardly, when the operation hereinbefore described will be repeated.

Having thus described my invention, what I claim, and desire to secure by Letters Patent, is—

1. In a triple valve, the combination with the valve casing formed with valve chambers of different diameters, of a piston adapted to reciprocate in the larger chamber, a stem on the piston, terminating at its lower end in a valve which controls the passage of air between the auxiliary reservoir and the brake cylinder, a spring seated valve in a chamber formed in the piston stem for controlling the passage of air between the train pipe and the auxiliary reservoir when communication is shut off between the auxiliary reservoir and the brake cylinder, an exhaust valve controlling an exhaust port, which is exposed to the pressure of the fluid or air in the brake cylinder, and a piston which is exposed to the pressure of the fluid or air in the auxiliary reservoir for operating and unseating the exhaust port valve when said pressure is admitted to the auxiliary reservoir from the train pipe, substantially as described.

2. In a triple valve, the combination with the valve casing formed with chambers of different diameters, a piston adapted to reciprocate in the larger chamber, the train pipe leading into said chamber above the piston, a chambered piston stem extending into the smaller chamber, a spring seated valve in the chambered stem, a passage leading from said smaller chamber into the auxiliary reservoir, a valve on the lower end of the stem for controlling the passage of air from the auxiliary reservoir to the brake cylinder, a pipe leading to the brake cylinder from below said valve, an exhaust valve controlling an exhaust port located between the last mentioned valve and the brake cylinder and adapted to be seated by the pressure of the air passing from the auxiliary reservoir to the brake cylinder, and a piston which unseats said valve when said piston is actuated by the increased pressure from the air or fluid passing from the train pipe to the auxiliary reservoir, to which said piston is exposed, substantially as described.

3. In a triple valve, the combination with the valve casing and suitable connections between its chambers and the train pipe, auxiliary reservoir, and brake cylinder, and of valves for controlling the passage of fluid or air from the train pipe to the auxiliary reservoir, and auxiliary reservoir to the brake cylinder, of an exhaust valve between the auxiliary reservoir and brake cylinder adapted to be seated and close the exhaust port when air or fluid is passing from the auxiliary reservoir to the brake cylinder, the valve casing being formed with a recess having a counterbore for receiving a piston which operates the exhaust port valve, and a passage 16 leading from the communicating chamber between the train pipe and the auxiliary reservoir to behind the piston 18, whereby an excess pressure of the air or fluid in the train pipe and auxiliary reservoir over that in the brake cylinder will unseat the exhaust port valve and permit the escape of the air in the brake cylinder, when communication is established between the train pipe and the auxiliary reservoir substantially as described.

4. In a triple valve, the combination with the valve casing and suitable connections between its chambers and the train pipe, auxiliary reservoir, and brake cylinder, and valves for controlling the passage of fluid or air from the train pipe to the auxiliary reservoir, and auxiliary reservoir to the brake cylinder, of an exhaust valve in the casing between the reservoir and brake cylinder which controls the exhaust of the brake cylinder, said valve being formed with a stem extending across the casing and having a bearing in an adjustable guide 23, and a piston seated in a recess formed in the valve casing, provided with a stem which extends through a counterbore of the seat of said piston in line with the exhaust port valve with which it is adapted to come in contact so as to unseat it, the valve casing being formed with a passage leading from the communicating chamber between the train pipe and the auxiliary reservoir to behind the piston, substantially as described.

In testimony whereof I have affixed my signature, in presence of two witnesses, this 19th day of March, 1892.

WILLIAM C. WHITACRE.

Witnesses:
SHEPARD KNAPP,
H. K. WAGNER.